United States Patent
Tame

(10) Patent No.: US 6,513,868 B1
(45) Date of Patent: Feb. 4, 2003

(54) EASY ACCESS SEAT ASSEMBLY WITH FULL MEMORY

(75) Inventor: Omar D. Tame, West Bloomfield, MI (US)

(73) Assignee: Magna Seating Systems Inc., Aurora (CA)

(*) Notice: Subject to any disclaimer, the term of this patent is extended or adjusted under 35 U.S.C. 154(b) by 0 days.

(21) Appl. No.: 09/831,031

(22) PCT Filed: Oct. 29, 1999

(86) PCT No.: PCT/CA99/01001

§ 371 (c)(1),
(2), (4) Date: May 3, 2001

(87) PCT Pub. No.: WO00/26056

PCT Pub. Date: May 11, 2000

Related U.S. Application Data

(60) Provisional application No. 60/106,916, filed on Nov. 3, 1998.

(51) Int. Cl.[7] .................................................. B60N 2/12
(52) U.S. Cl. ............................................................ 296/341
(58) Field of Search ............................ 297/341, 378.12; 248/429, 430

(56) References Cited

U.S. PATENT DOCUMENTS

| | | | |
|---|---|---|---|
| 3,940,182 A | | 2/1976 | Tamura |
| 3,981,473 A | | 9/1976 | Nagai |
| 4,671,571 A | * | 6/1987 | Gionet ........................ 248/429 |
| 4,742,983 A | * | 5/1988 | Nihei ......................... 297/341 |
| 4,852,846 A | | 8/1989 | Weier |
| 4,881,774 A | | 11/1989 | Bradley et al. |
| 4,898,356 A | | 2/1990 | Pipon et al. |
| 5,100,092 A | | 3/1992 | Sovis |
| 5,137,331 A | * | 8/1992 | Colozza ....................... 297/341 |
| 5,352,019 A | * | 10/1994 | Bauer et al. ................. 297/341 |
| 5,605,377 A | * | 2/1997 | Tame .......................... 248/430 |
| 5,626,392 A | * | 5/1997 | Bauer et al. ............ 297/378.12 |
| 5,741,000 A | | 4/1998 | Goodbred |

FOREIGN PATENT DOCUMENTS

| | | |
|---|---|---|
| EP | 0 135 596 B1 | 7/1987 |
| GB | 2 286 522 A | 8/1995 |

* cited by examiner

Primary Examiner—Peter R. Brown
(74) Attorney, Agent, or Firm—Clark Hill PLC

(57) ABSTRACT

A seat assembly (24) is mounted to a seat cushion assembly (22) for movement between an operative position and a forwardly dumped access position generally overlying the seat cushion assembly (22). A fixed track assembly (36, 42) movably supports a movable track assembly (45, 46) carrying the seat cushion assembly (22) for movement between a forward access position and a rearward position. A releasable track locking assembly (56, 57) is movable between a track locking position and a track releasing position for allowing adjustment of the movable track assembly (45, 46) between fore and aft positions with respect to the fixed track assembly (36, 42). A memory track (76) is fixed with respect to the fixed track assembly (36, 42) and a memory slide (78) is fixed with respect to the memory track (76). A slide block (100) is slidably supported by the memory slide (78). A memory latch (98) is supported by a slide block (100) and is movable between a memory position and an adjustment position.

12 Claims, 8 Drawing Sheets

EASY ACCESS SEAT ASSEMBLY WITH FULL MEMORY

This application claims the benefit of Provisional Application Ser. No. 60/106,916, filed Nov. 3, 1998.

FIELD OF THE INVENTION

The present invention is directed to a vehicle seat that has an easy access seat dumping mechanism with full memory which allows the seat to be moved to a forward access position and then returned to a memory position upon return of the seat from the forward access position and which does not interfere with the fore and aft movement of the seat during a normal comfort adjustment thereof.

DESCRIPTION OF THE PRIOR ART

Such seats frequently include a seat cushion assembly for supporting an occupant when seated thereon, a seat back assembly for supporting the back of an occupant seated on the seat cushion assembly, and a mounting assembly mounting the seat back assembly on the seat cushion assembly for movement between an operative position and a forwardly dumped access position generally overlying the cushion assembly. A fixed track assembly is attached to a vehicle and a movable track assembly carrying the seat cushion assembly is movably supported by the fixed track assembly for movement between a forward access position and a rearward position. A releasable track locking assembly is movable between a track locking position for locking the movable track assembly with respect to the fixed track assembly and a track releasing position for allowing adjustment of the movable track assembly between fore and aft positions with respect to the fixed track assembly.

Various rear entry seat assemblies are known in the prior art which include this combination of elements. Examples are disclosed in U.S. Pat. Nos. 3,940,182 to Tamura, 4,852, 846 to Weir, U.S. Pat. No. 4,881,774 to Bradley et al, U.S. Pat. No. 4,898,356 to Pipon et al and U.S. Pat. No. 5,100,092 to Sovis, and British Patent No. 2 286 522. Many such assemblies utilize the same interlocking abutments for both the normal seat adjustment and the memory latching mechanism which compounds wear on the abutments. The Bradley et al '774 patent isolates or separates the normal seat adjustment latching mechanism from the memory latching mechanism by utilizing a separate track with abutments for coacting with a memory latching mechanism. In other words, a memory track is fixed with respect to the fixed track assembly and a memory slide is fixed with respect to the memory track. The British '522 patent discloses a memory device having a memory latching mechanism which engages and disengages a memory slide mounted within a track assembly. The track assembly also includes a track locking device for securing a movable track portion to a fixed track portion. During normal incremental adjustment of the track assembly, the memory latching mechanism engages and disengages the memory slide along with the track locking assembly. In other words, both the memory latching mechanism and the track locking device engage and disengage the memory track and the fixed track, respectively, during each and every adjustment of the seat. The repeated engagement of the memory latching mechanism increases the wear of the memory device such that the device may become ineffective. In addition, there must be sufficient force applied to the memory device each time the track assembly is adjusted in order to ensure that the memory feature will be implemented.

It remains an objective in such assemblies to reduce friction and wear and the separation of the normal seat adjustment latching mechanism from the memory latching mechanism is a step in that direction. However, there is a continuing effort to reduce the friction and the resulting effort to move such seat assemblies and particularly in the operation of the parasitic friction of the additional or separate memory latching mechanism utilizing the separate memory track.

SUMMARY OF THE INVENTION

The subject invention provides an easy access vehicle seat with smooth operation and reduced friction and wear. A seat back assembly for supporting the back of an occupant is mounted to a seat cushion assembly for supporting an occupant when seated thereon and for movement between an operative position and a forwardly dumped access position generally overlying the seat cushion assembly. A fixed track assembly for attachment to a vehicle movably supports a movable track assembly carrying the seat cushion assembly for movement between a forward access position and a rearward position. A releasable track locking assembly is movable between a track locking position for locking the movable track assembly with respect to the fixed track assembly and a track releasing position for allowing adjustment of the movable track assembly between fore and aft positions with respect to the fixed track assembly. A memory track is fixed with respect to the fixed track assembly and a memory slide is fixed with respect to the memory track. A memory latch is supported by a slide block slidably engaging the memory track. The memory latch is movable between a memory position and an adjustment position. The memory latch is uncoupled from the movable track assembly and interlocks with the memory track while in the memory position thereby limiting independent return travel of the seat cushion, and coupled to the movable track assembly and disengaged from the memory track while in the adjustment position enabling the adjustment of the movable track assembly.

Accordingly, the subject invention provides a separate memory latching mechanism which is fabricated to reduce friction and wear by utilizing a slide block to spread out the wearing surface with the memory slide.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
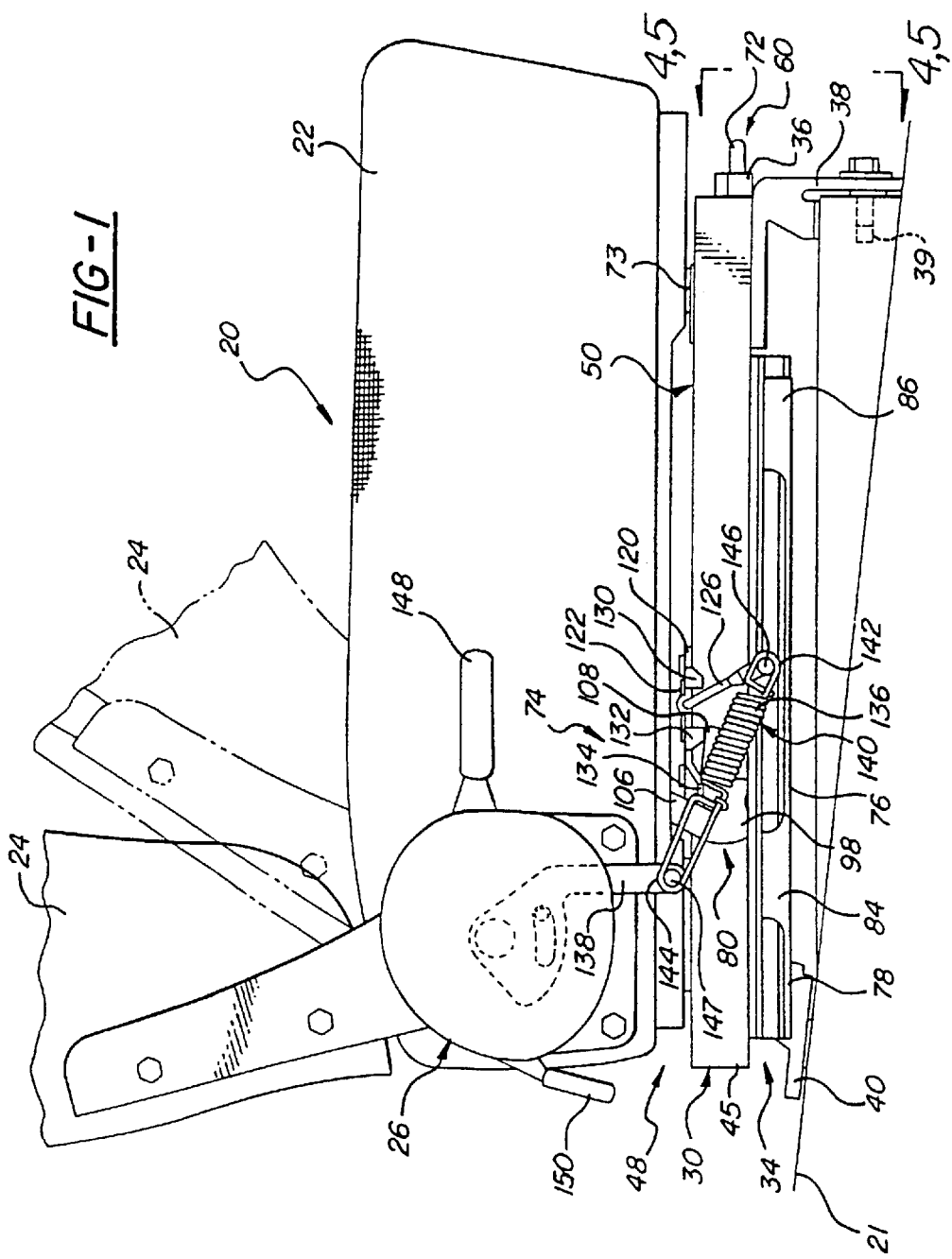
FIG. 1 is a fragmentary outboard side elevational view of a vehicle seat embodying the principles of the preferred embodiment and best mode of the present invention and including a seat cushion assembly, a seat back assembly and a seat back mounting assembly.

FIG. 1 shows a vehicle seat 20 that exemplifies the preferred embodiment and best mode of the principles of the present invention. The seat 20 is mounted to the floor 21 of a conventional vehicle. The vehicle seat 20 shown in the drawings is configured for installation on the right side of a front row of vehicle seats where the right side is considered from the point of view of a forwardly facing vehicle occupant, but it is contemplated to provide a vehicle seat of mirror image configuration for installation on the left side of the front row of seats in the vehicle. It will therefore be understood that the embodiments of the vehicle seat 20 shown in the figures are exemplary only and not intended to be limiting. Only the right side vehicle seat 20 will be discussed herein, but it is understood that the discussion applies equally to a vehicle seat configured for installation on the left side of a vehicle.

The seat 20 includes a seat cushion assembly 22, a seat back assembly 24, a seat back mounting assembly 26, a fixed track assembly 28 and a movable track assembly 30.

Figure 3:
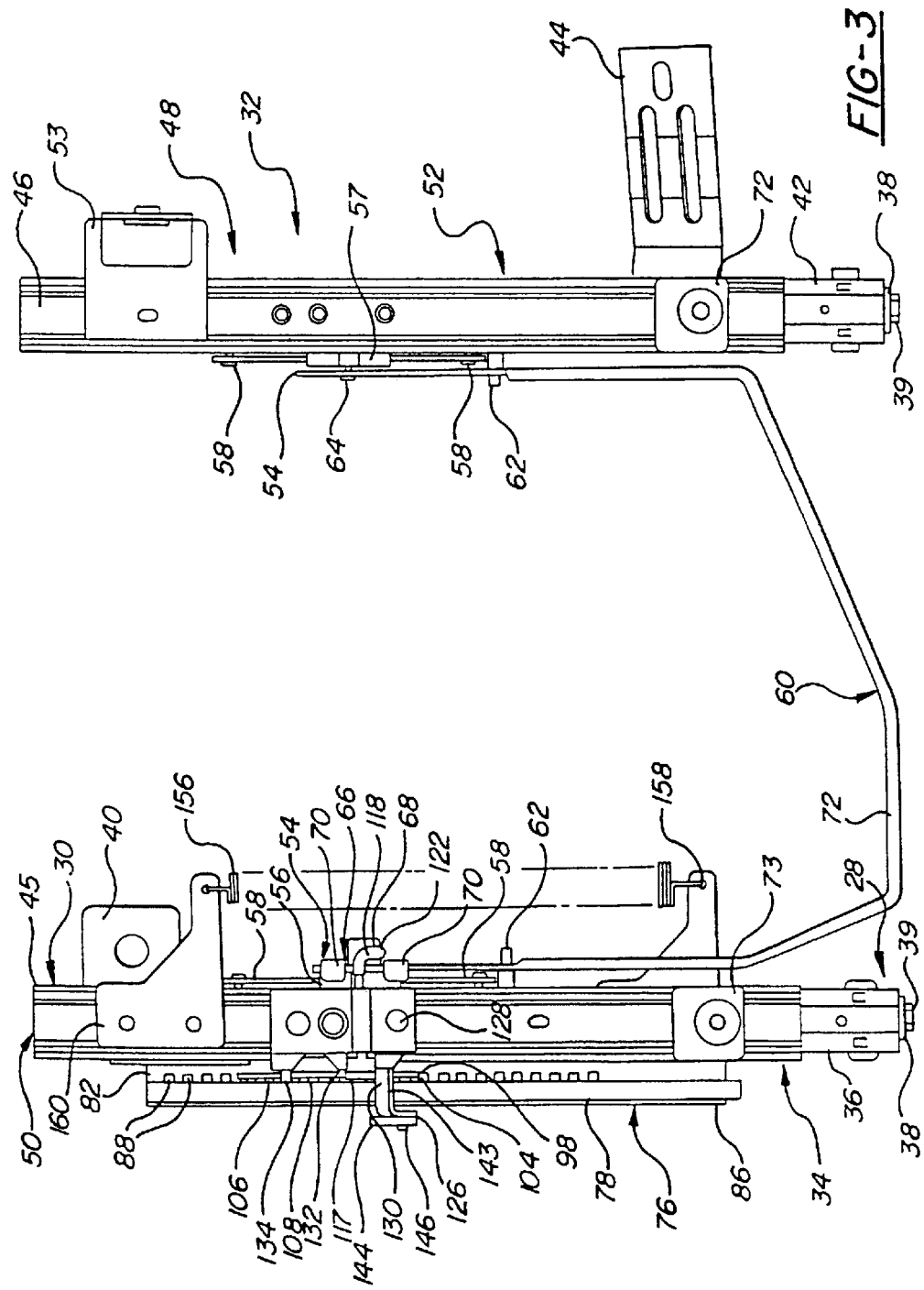
FIG. 3 is a top plan view of a track assembly of the vehicle seat showing the structure of the seat memory unit and an asymmetric U-shaped handle.

The fixed track assembly 28 includes an outboard fixed track 36 on an outboard side 34 of the seat and an inboard fixed track 42 on an inboard side 32 of the seat 20 where the outboard side 34 of the seat 20 is adjacent a vehicle door and the inboard side 32 is spaced toward the longitudinal center of the vehicle. The fixed tracks 36, 42 are best seen in FIG. 3 which shows a top plan view of the seat with the seat cushion assembly 22, seat back assembly 24 and seat back mounting assembly 26 removed to more clearly illustrate the invention.

The outboard fixed track 36 is secured to the floor 21 in a conventional manner by a front support 38 and a cooperating anchoring pin 39 and by a rear support 40 which is bolted to the floor 21 or secured thereto by any other suitable means; the inboard fixed track 42 is secured to the floor 21 in a conventional manner by front support 38 mounted thereto in the same manner as front support 38 and by a mounting bracket 44. The front and rear supports 38, 40 are secured to the outboard fixed track 36 by rivets 41 and by rivets 43, 94, respectively.

Figure 4:
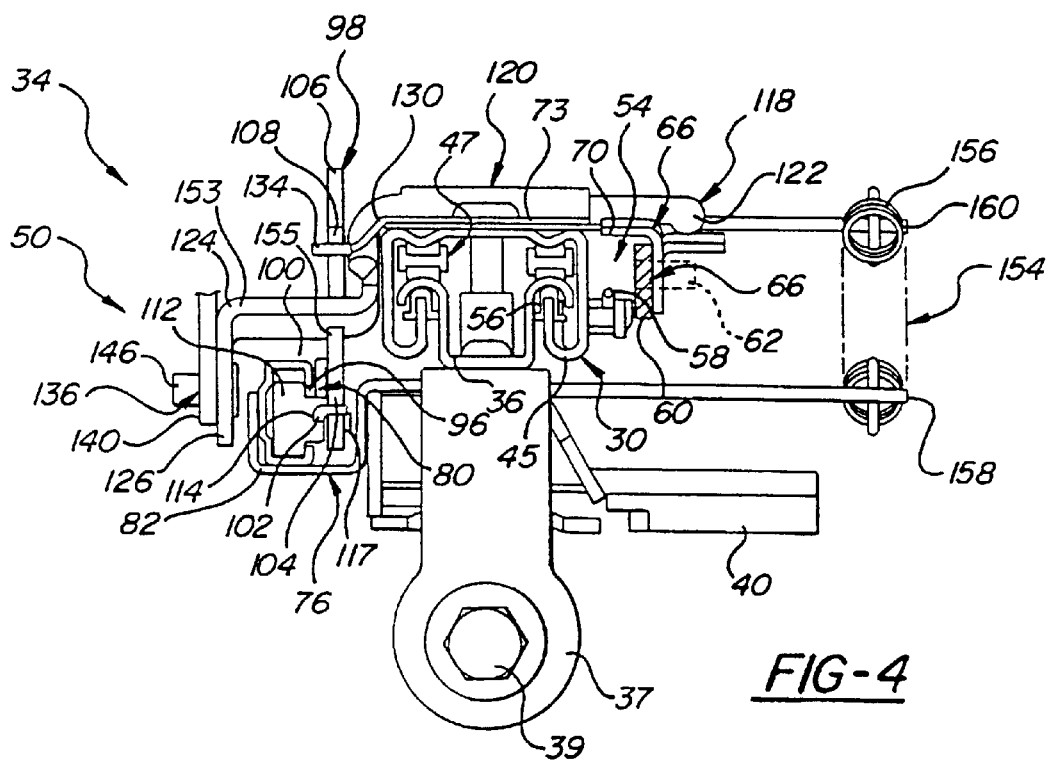
FIG. 4 is an end view of the outboard pair of tracks taken along the line of sight 4—4 as indicated in FIG. 1.
Figure 5:
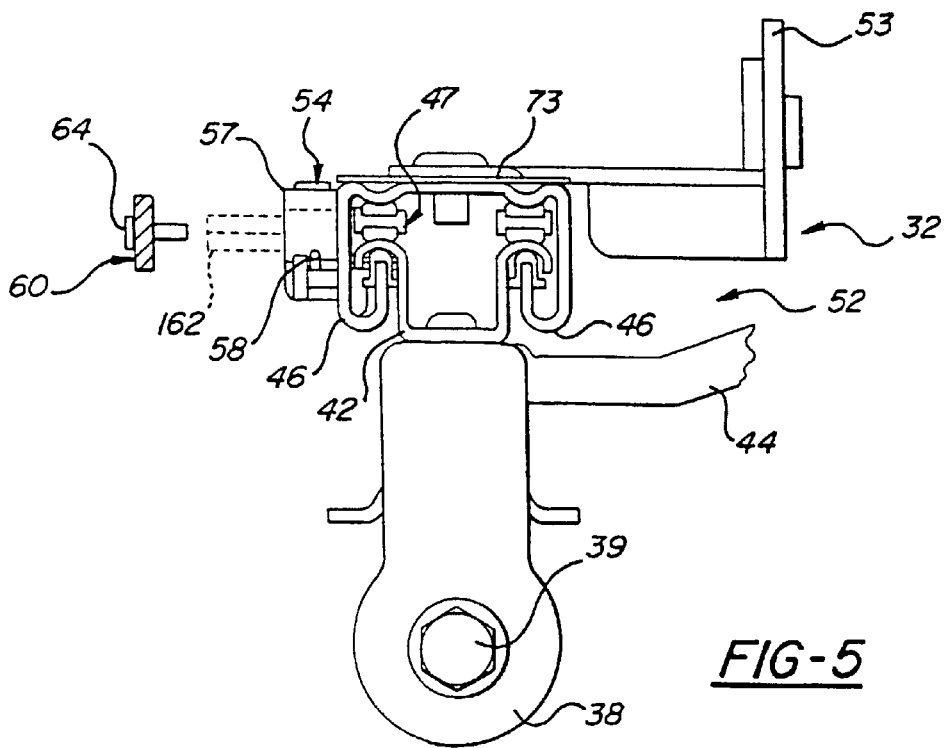
FIG. 5 is an end view of the inboard pair of tracks taken along the line of sight 5—5 as indicated FIG. 1.

The movable track assembly 30 includes movable track members 45, 46 interengaged with the fixed tracks 36, 42, respectively, and a plurality of rolling assemblies 47 (best seen in the exploded view of FIG. 2 and the end views of FIGS. 4–5) that rollingly supported the movable tracks 45, 46 on the fixed tracks for fore and aft movement of the movable track assembly 30 with respect to the fixed track assembly 28. The movable track assembly 30 and fixed track assembly 28 together comprise a track assembly, generally designated 48. The outboard fixed and movable tracks 36, 45 comprise an outboard pair of tracks 50 and the inboard fixed and movable tracks 42, 46 comprise an inboard pair of tracks 52. A conventional seat belt anchor 53 is mounted in a conventional manner to the movable track 46.

The track assembly 48 is releasably locked to prevent fore and aft movement of the movable track assembly 30 with respect to the fixed track assembly 28 by a track locking assembly 54 that includes a lock structure 56, 57 on each pair of tracks 50, 52, respectively. Each lock structure 56, 57 is normally resiliently biased upwardly into a track locking position by a pair of spring arms 58 to lock the track assembly 48. The lock structures 56, 57 can be moved downwardly against the spring force to a releasing position so the movable track assembly 30 can move fore and aft on the fixed track assembly 28.

The details of the structure and operation of the track assembly 48 and the track locking assembly 54 are fully disclosed in U.S. Pat. No. 5,741,000 issued Apr. 21, 1998 entitled "Vehicle Seat Track Assembly".

An asymmetric U-shaped lock releasing handle 60 is PivotTable mounted on pivot shafts 62 that extend perpendicularly outwardly from side surfaces of the movable tracks 45, 46.

A lock engaging pin 64 secured to the inboard side of the lock releasing handle 60 engages a central bore in the inboard lock structure 57. The end of the outboard side of the lock releasing handle 60 has a flanged member 66 rigidly secured thereto that has an inwardly extending flange 68 and outwardly extending flanges 70 formed thereon. The outwardly extending flanges 70 are disposed above the outboard lock structure 56 when the lock releasing handle 60 is in the equilibrium position thereof in position to engage and move the lock structure 56 downwardly to the track releasing position when a handle portion 72 of the lock releasing handle 60 is lifted to move the same to an actuated position. There is a one-way motion transmitting connection between the flanged member 66 of the handle 60 and the lock structure 56. Preferably, there is a small lost motion gap between the flanged member 66 and the top surface of the lock structure 56 when the lock releasing handle 60 is in its equilibrium position.

When the lock releasing handle 60 is lifted to its actuated position, it pivots about the shafts 62 and depresses both lock structures 56, 57 to unlock the track assembly 48 to allow the movable track assembly 30 to slide freely with respect to the fixed track assembly 28. The operation of the handle 60 is considered in detail below.

The lock releasing handle 60 can have a hollow tubular structure constructed of steel or other appropriate metal to provide the handle 60 with resilient flexibility. The end portions of the lock releasing handle 60 are flattened in a conventional manner.

The seat cushion assembly 22 is mounted to the movable track assembly 30 in a conventional manner so that the movable track assembly 30 carries the seat cushion assembly 22 fore and aft as the assembly 30 moves along the fixed tracks 38, 42. Conventional square washers 73 are mounted to the movable track assembly 30 to facilitate the mounting of the seat cushion assembly 22 thereon.

The scat back assembly 24 is releasably held in an operative position by the seat back mounting assembly 26 for movement between an operative position in which the seat back assembly 24 is positioned to support a passenger and a forwardly dumped access position generally overlying the seat cushion assembly 22. The seat back mounting assembly 26 is conventional and includes a conventional sector gear recliner mechanism.

The interengaged track assemblies 28, 30 are not necessarily parallel to the floor 21 in their final installed configuration. The assemblies 28, 30 are typically slightly angled with respect to the floor 21 so that they slope upwardly in the forward direction as illustrated in FIG. 1 to hold the seat cushion assembly 22 in a comfortable position for a passenger.

A seat memory unit 74 is mounted to the vehicle seat 20 in a manner best shown in FIGS. 1–4. The seat memory unit 74 includes a memory track 76, a memory slide 78 and a memory latch assembly 80.

Figure 2:
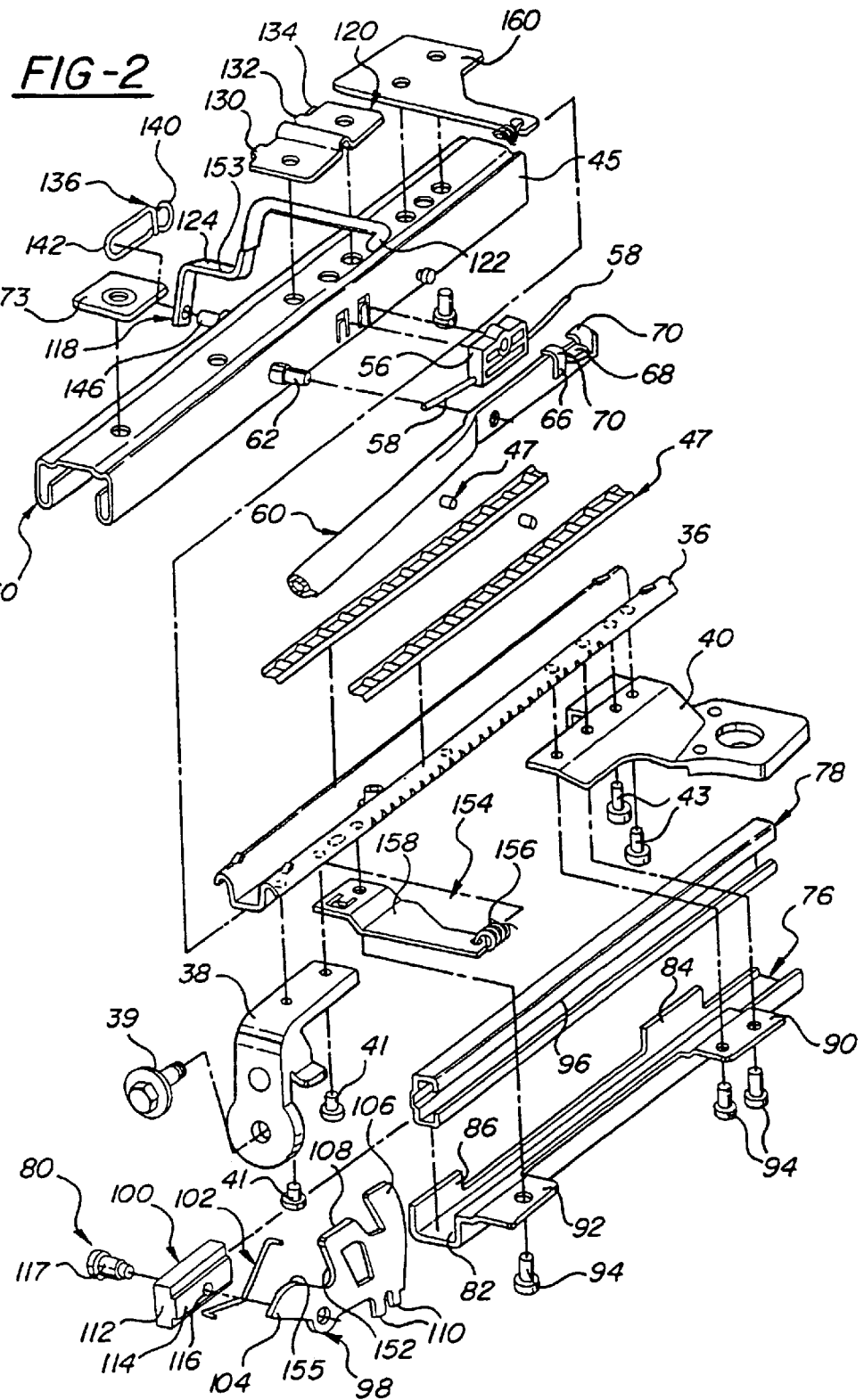
FIG. 2 is an exploded view showing an outboard side pair of tracks and a seat memory unit of the vehicle seat according to the principles of the present invention.

The memory track 76 is a generally U-shaped channel having a base 82, a first side section 84 and a second side section 86. A plurality of square apertures 88 are formed longitudinally along the base 82. A first flange member 90 and a second flange 92 extend outwardly from the memory track 76 to mount the track 76 to the outboard fixed track 36 as indicated in FIG. 2 by conventional rivets 94 and welding or any other suitable means. The memory track 76 is made of rolled sheet steel or any other suitable metal.

The memory slide 78 is an elongated C-shaped channel preferably made of rolled sheet steel and secured to the base 82 and side sections 84, 86 of the memory track 76 by welding or other suitable means. The memory slide 78 has a longitudinally extending center slot 96 adjacent the apertures 88 of the base 82.

The memory latch assembly 80 includes a memory latch 98, a block 100 and a spring 102. The memory latch 98 is a planar structure preferably made of sheet steel that is shaped to form a forwardly extending arm portion 104, a pair of spaced upwardly extending portions 106 and 108 and a pair of downwardly extending teeth 110.

The block 100 has an elongated rectangular body portion 112, a V-shaped slot 114 and a central bore 116. The spring 102 is generally V-shaped with angularly extending ends and is sized to fit within the slot 114. The memory latch 98 is pivotally mounted to the block 100 by a rivet 117 and the spring 102 engages the memory latch 98 when so mounted.

The block 100 is made of plastic or other suitable material and is slidably received within the memory slide 78 and pivotally supports a forward portion of the memory latch 98 generally above the memory track 76 so that the memory latch 98 can be pivotally moved between a movable adjusting position in which the memory latch 98 engages or is latched to the outboard movable track 45 to allow the memory latch 98 to move fore and aft with the seat cushion assembly 22 during a comfort adjustment of the seat 20 when the seat is in normal use supporting a passenger and a fixed memory position in which it is releasably latched with the memory track 76 to mark a seat return or memory position along the memory track 76. This is considered in detail below. The spring 102 pivotally biases the memory latch 98 into a fixed memory position, thereby urging the teeth 110 downwardly toward and into engagement with adjacent apertures of the plurality of apertures 88 in the memory track 76 when the memory latch 98 is released from the movable adjusting position.

The seat memory unit 74 further includes an actuating member 118 pivotally mounted on the outboard movable track 45 by a holder member 120. The actuating member 118 is generally U-shaped and has a short end 122 and a stepped end 124. The short end 122 is sized to engage the flange 68 on the lock releasing handle 60 when the actuating member 118 is pivoted in a manner described below to move the handle 60 from the equilibrium position to the actuated position. The stepped end 124 extends outwardly over the memory track 76 and memory slide 78 and then downwardly, terminating in a distal end 126. The actuating member 118 is preferably an integral structure constructed of steel or other suitable metal.

The holder member 120 is preferably constructed of steel or other metal and is secured to the top of the outboard movable track 45 by rivets 128 to hold the actuating member 118 pivotally on the top of the track 45. The holder member 120 has a forward flange 130, a middle flange 132 and a rearward flange 134 which extend generally outwardly in a manner best seen in FIGS. 3–4 toward the outboard side of the seat 20.

A connecting member 136 is connected between a downwardly extending arm 138 on the seat back mounting assembly 26 and the actuating member 118. The connecting member 136 has a resiliently flexible central coil spring portion 140 and forward and rearward loop portions 142, 144, respectively. The connecting member 136 is pivotally connected to the actuating member 118 and the arm 138 by rivets 146, 147 or other suitable means to form a one-way lost motion therebetween. The downwardly extending arm 138 is constructed and arranged to move cooperatively with the seat back assembly 24 when the same moves from the operative position thereof to the dumped access position thereof and back to the operative position thereof during a seat dump operation. The outboard side 34 of the seat back assembly 24 is provided with a manual reclining control handle 148 and a manual rear seat back release handle 150, both of which are part of the seat back mounting assembly 26. The recliner control handle 148 unlocks the seat back assembly 24 to allow it to pivot through a predetermined operating range of pivotal comfort adjustments in a conventional manner to adjust the angle between the seat cushion assembly 22 and the seat back assembly 24 for maximizing seat occupant comfort.

The seat back release handle 150 is used to unlock and release the seat back assembly 24 from its adjusted operating position within the predetermined range of comfort adjustments to pivot the seat back assembly 24 forwardly to the dumped access position.

The seat memory unit 74, the connecting member 136, the memory track 76 and associated structures and portions of the seat back mounting assembly 26 may be covered by a protective covering in the final installation which covering is not shown in the figures to more clearly illustrate the invention.

Operation

When the vehicle seat 20 is in its normal operating position (illustrated shown in FIG. 1) the seat can be manually unlocked to effect a comfort adjustment of the seat cushion assembly 22 with respect to the fixed track assembly 28 by lifting the handle portion 72 of the lock releasing handle 60 upwardly from the equilibrium position to the actuated position. The lock structures 56, 57 are moved downwardly from the track locking position to a track releasing position to unlock the track assembly 48.

During the unlocking movement of the lock releasing handle 60, there is no lost motion between the lock engaging pin 64 and the associated lock structure 57. There is, however, free travel or lost motion between flanged member 66 and lock structure 56 because of the free travel gap between the flanged member 66 and lock structure 56 when the handle 60 is in the equilibrium position. Consequently, there is immediate downward movement of lock structure 57, but no initial movement of lock structure 56 until the flanged member 66 contacts the top thereof.

The inboard lock structure 57 (hereinafter referred to as being on the "pinned side" of the lock releasing handle 60 because it is engaged by the lock engaging pin 64) unlocks first by reaching the downward extent of its motion. The outboard lock structure 56 unlocks thereafter by reaching the downward extent of its movement. The lock releasing handle 60 resiliently flexes slightly to allow the full downward movement of the lock structure 56 on the outboard side (hereinafter referred to as being on the "flanged side" of the lock releasing handle 60).

When both lock structures 56, 57 are unlocked, the seat cushion assembly 22 and the associated structures can slide fore and aft with respect to the fixed track assembly 28 to any desired position of comfort adjustment along the fixed track assembly 28.

The memory latch 98 is normally held in the movable adjusting position thereof when the seat 20 is in normal use. When the latch is in this position, the memory latch assembly 80 moves fore and aft during a comfort adjustment without affecting seat movement or operation.

The seat cushion assembly 22 remains unlocked as long as the lock releasing handle 60 is held in the actuated position. When the seat cushion assembly 22 is in the desired position, the track assembly 48 is relocked by letting go of the lock releasing handle 60. The spring arms 58 move both lock structures 56, 57 from their track releasing positions to their track locking positions to relock the tracks. This movement of the lock structures 56, 57 carries the lock releasing handle 60 from its actuated position back into its equilibrium position.

Specifically, when the handle 60 is released, both lock structures 56, 57 bias the handle 60 toward its equilibrium position until the lock structure 56 on the flanged side reaches its track locking position. Thereafter the lock structure 57 on the pinned side continues to carry the handle 60 back to its equilibrium position, simultaneously moving the flanged member 66 away from the top of lock structure 56 and reestablishing the free travel gap therebetween. As the handle 60 returns from its actuated position to its equilibrium position, it resiliently returns to its unflexed shape.

The Seat Dumping Operation

The seat back assembly 24 can be dumped and the seat cushion assembly 22 moved forwardly to an access position to allow access to the rear seat of, for example, a two-door vehicle. The seat 20 has a memory feature and an easy access feature to allow the seat cushion assembly 22 to be easily moved forwardly to the access position and then returned therefrom to the same adjusted operative position or memory position the seat cushion assembly 22 was in with respect to the fixed track assembly 28 immediately prior to the commencement of a rear seat accessing operation.

To engage the seat memory and easy access features, the user lifts the seat back release handle 150 to release the seat back assembly 24 to allow the same to pivot to the dumped access position (illustrated in phantom lines in FIG. 1). A conventional seat back spring system of the seat back mounting assembly 26 spring biases the seat back assembly 24 from any adjusted operating position in the recliner range thereof forwardly toward and into the dumped access position.

The predumped configuration of the vehicle seat 20 is shown in FIG. 1. It can be appreciated from this figure that the memory latch 98 is normally held in the movable adjusting position thereof by the actuating member 118. As the seat back assembly 24 moves to the dumped access position, the downwardly extending arm 138 moves rearwardly therewith. This moves the connecting member 136 rearwardly which in turn pivots the actuating member rearwardly through its operative access stroke. The connecting member 136 provides no lost motion between the downwardly extending arm 138 and the actuating member 118 during a seat back dumping operation.

Figure 6:
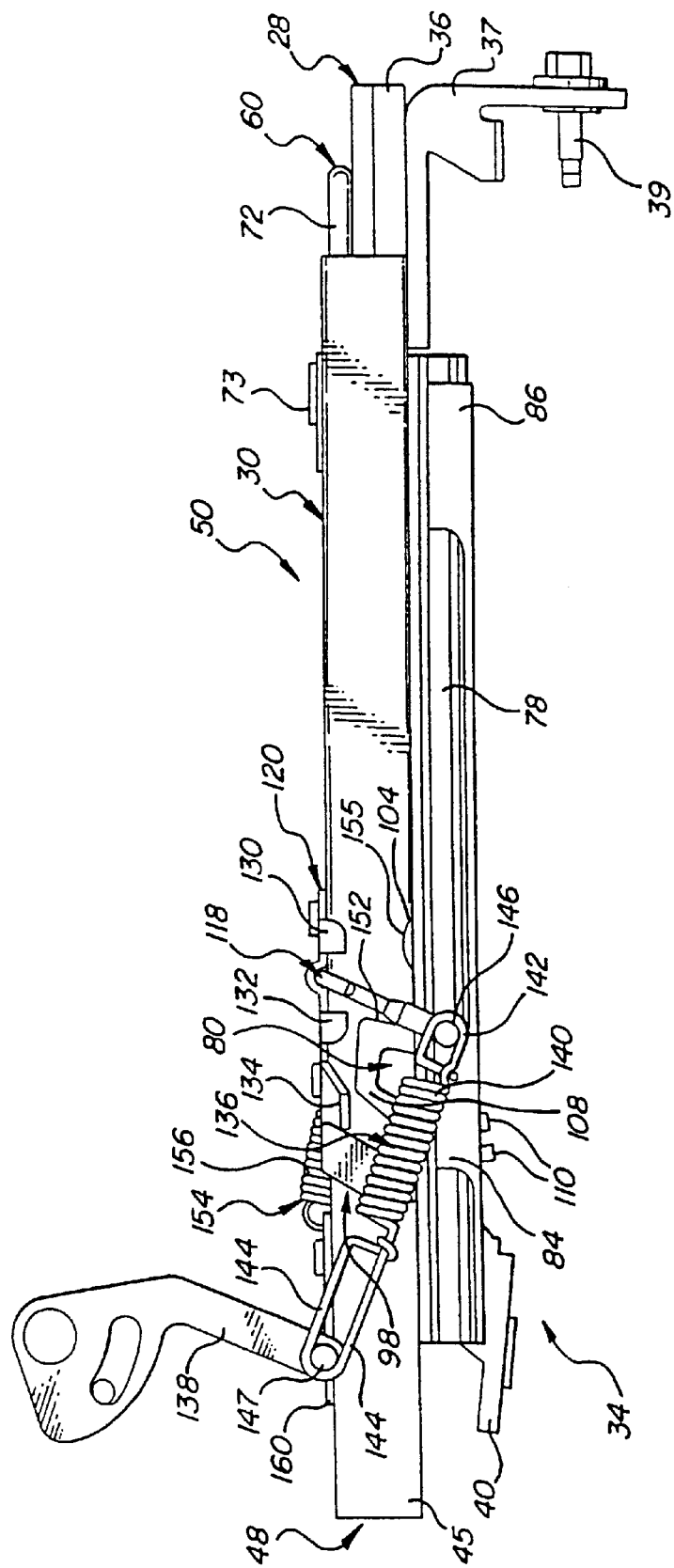
FIG. 6 shows a side elevational view of the outboard side of the vehicle seat in a parially dumped configuration with the seat cushion assembly, the seat back assembly and a portion of the seat back mounting assembly removed.
Figure 7:
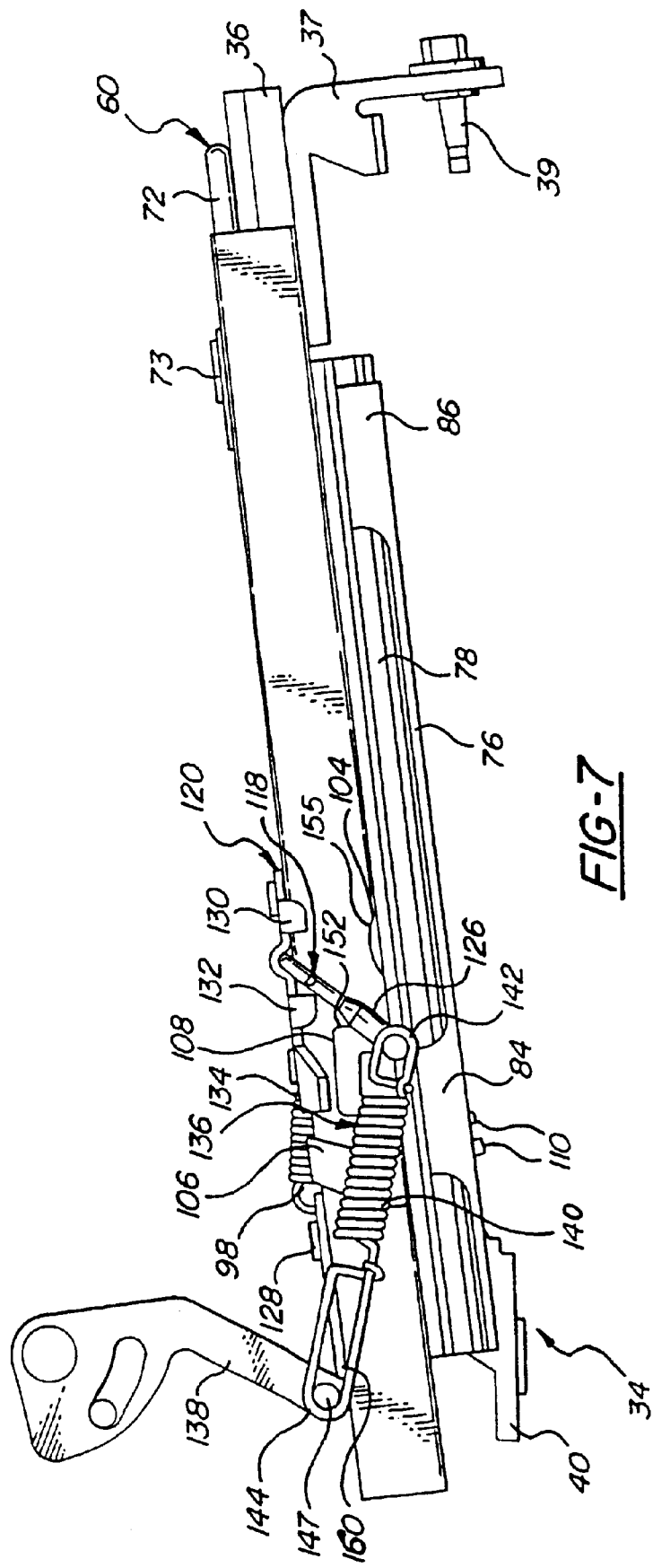
FIG. 7 shows a view of the vehicle seat similar to the view of FIG. 6 showing the vehicle seat in a fully dumped configuration.

The operative access stoke of the actuating member 118 can be understood with reference to FIGS. 1, 6 and 7. The actuating member 118 is constructed and arranged to be moved between an inoperative position (illustrated in FIG. 1) through the operative access stroke into a lock release retaining position (illustrated, for example, in FIG. 7). It is understood that the movement of the actuating member 118 through this stroke is normally one continuous movement.

The movement of the actuating member 118 through the operative access stroke effects three results: (1) the memory latch 98 is allowed to move from its movable adjusting position to its fixed memory position to mark the memory position or operative position of the seat cushion assembly 22 at the commencement of the rear seat accessing operation, (2) the track locking assembly 54 is moved from its track locking position to its track releasing position to unlocked the track assembly 48 to allow the movable track assembly 30 to slide forwardly relative to the fixed track assembly 28, and (3) thereafter the movable track assembly 30, the seat cushion assembly 22 and associated structures are moved forwardly out of the memory position to enable the movable track assembly 30 to carry the seat cushion assembly 22 toward and into the forward access position. The forward access position is the forwardmost position of the movable track assembly 30 relative to the fixed track assembly 28.

More specifically, the actuating member 118 has an outwardly extending arm portion 153 (best seen in FIG. 2) that cooperates with a camming surface 155 on the forwardly extending arm portion 104 of the memory latch 98 to control the pivotal movement of the memory latch 98. There is in general a one-way abutting relation between the actuating member 118 and the memory latch 98. When the actuating member 118 is in the inoperative position and the memory latch 98 is in the movable adjusting position, the outwardly extending arm portion 153 is in abutting relation with the camming surface 155 on the memory latch 98 and retains the memory latch 98 in the movable adjusting position in an unlatched position with respect to the memory track 76 against the spring force of the spring 102 of the memory latch assembly 80.

Figure 8:
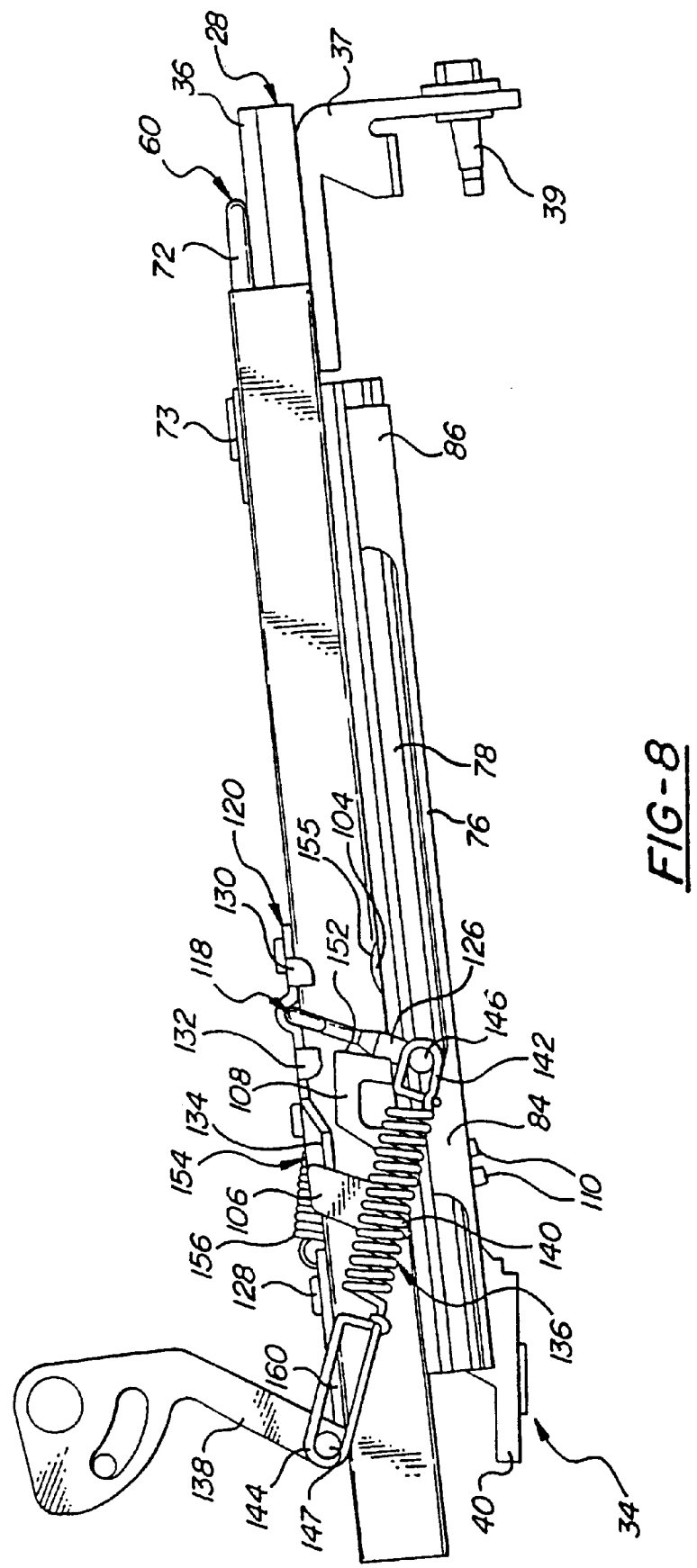
FIG. 8 shows a view of the vehicle seat similar to the view of FIG. 6 showing the vehicle seat stopped in a memory position after the seat was returned from an access position.

When the connecting member 136 moves the actuating member 118 through its operative access stroke, the outwardly extending arm portion 153 moves out of contact with the camming surface 155 of the memory latch 98 which allows the spring 102 of the memory latch assembly 80 to bias the rearward end of the memory latch 98 downwardly toward the memory track 76 so the teeth 110 extend through adjacent apertures 88 of the track 76. This latches the memory latch 98 to the memory track 76 in a fixed memory position relative to the fixed track assembly 28 and prevents the memory latch from being longitudinally displaced forwardly or rearwardly relative thereto until the memory latch 98 is moved back to its movable adjusting position by the action of the actuating member 118 as the member moves through its return stroke as described below. It can be understood that the fixed memory position marks the adjusted operating position of the seat cushion assembly 22 relative to the fixed track assembly 28 immediately before the commencement of the seat dumping operation and that this position therefore may vary from operation to operation. FIGS. 7–8 show the memory latch 98 in a fixed memory position.

As the actuating member 118 moves out of the inoperative position, the short end 122 of the actuating member 118 pivots downwardly against the flange 68 on the flanged member 66 which in turn moves the lock releasing handle 60 toward its actuated position to unlock the track locking assembly 54. The lock releasing handle 60 is sufficiently stiff to move the lock structure 57 on the inboard side 32 toward and into its release position.

After the rearwardly moving actuating member 118 unlocks the track locking assembly 54, the arm portion 153 of the actuating member 118 cams over a forwardly facing camming surface 152 on the memory latch 98 as the seat back assembly 24 continues to move toward its dumped access position which thrusts the seat cushion assembly 22 forwardly relative to the fixed track assembly 28 to initiate the movement of the seat cushion assembly 22 and associated structures forwardly toward the access position. Thus, the weight and inertial force of the seat back assembly 24 begin the forward movement of the seat cushion assembly 22 which provides easy access to the rear seat.

The actuating member 118 continues to move rearwardly through its operative access stroke until it contacts and is stopped against the middle flange 132 on the holder member 120. In this position, the actuating member 118 is said to be in the lock release retaining position because the short end 122 of the actuating member 118 has pivoted until it is essentially perpendicular to the flange 68 on the flanged member 66 or has pivoted slightly beyond the perpendicular position which holds the lock releasing handle 60 in its actuated position against the upwardly directed spring force of the track locking assembly 54 to retain the lock structures 56, 57 in the track releasing positions thereof. The spring force of the spring arms 58 of the tack locking assembly 54 hold the actuating member 118 in the lock release retaining position.

The central coil portion 140 of the connecting member 136 has sufficient tensile strength to move the actuating member 118 from the inoperative position thereof to the lock release retaining position thereof without flexing.

The seat cushion assembly 22 and associated structures slide forwardly with the assistance of a seat cushion spring system 154 toward and into the seat cushion assembly 22 access position. The seat cushion spring system 154 is operatively mounted between the fixed track assembly 28 and the movable track assembly 30 (as best seen in FIGS. 2–3). Specifically, the seat cushion spring system 154 is comprised of a coil spring 156 mounted between forward and rearward spring mounting structures 158, 160, respectively, mounted to the fixed track 36 and movable track 45, respectively.

Returning the Seat from the Forward Access Position

Typically, after the vehicle user has finished accessing the rear seat, the user moves the seat cushion assembly 22 rearwardly from the access position thereof back to the operative or memory position marked by the position of the memorylatch 98. As the seat cushion assembly 22 slides rearwardly toward the memory position, the arm portion 153 of the actuating member 118 impacts or abuts the forwardly facing camming surface 152 of the memory latch 98 before the seat cushion assembly 22 reaches the memory position and continued movement of the seat cushion assembly 22 toward and into the memory position pivots the actuating member 118 out of its the lock release retaining position.

The seat cushion assembly 22 moves rearwardly until the rearward flange 134 on the holder member 120 contacts the upwardly extending portion 106 on the memory latch 98 which stops the seat cushion assembly 22 in its operative or memory position.

The coil spring portion 140 of the connecting member 136 expands or resiliently flexes slightly as illustrated in FIG. 8 to accommodate the forward movement of the actuating member 118 when the seat cushion assembly 22 is returned while the seat back assembly 24 is still fully dumped. Because the seat back assembly 24 is in the dumped access position, the connecting member 136 does not have sufficient tensile strength to pivot the seat back assembly 24 rearwardly and the inertial force of the seat cushion assembly 22 as it moves rearwardly while the actuating member 118 is in contact with the stationary memory latch 98 is relatively high. This exerts a high tensile force on the connecting member 136 and the member 136 resiliently expands in response. A tensile force of this magnitude is not exerted on the connecting member 136 when the seat back assembly 24 is moved from the operative position to the dumped access position thereof so the coiled portion of the connecting member 136 does not expand when the seat back assembly 24 is initially dumped.

The movement of the actuating member 118 out of the lock release retaining position moves the short end 122 thereof forwardly and out of its essentially perpendicular position on the flanged member 66 so that the spring force of the track locking assembly 54 acting through the lock releasing handle 60 biases the actuating member 118 toward the inoperative position thereof, but the actuating member 118 is prevented from moving through the return stroke thereof back to the inoperative position by the connecting member 136. The coil portion 140 of the connecting member 136 remains in the slightly stretched configuration (shown in FIG. 8) under the spring force of the track locking assembly 54 until the seat back assembly 24 is returned toward the operative position thereof.

After the seat cushion assembly 22 is stopped in the memory position, the vehicle user typically pivots the seat back assembly 24 rearwardly against the spring force provided by the seat back spring system toward and into the operative position thereof. The movement of the seat back assembly 24 from the dumped access position to the operative position thereof allows the connecting member 136 to return to its unflexed configuration and to move forwardly which in turn allows the actuating member 118 to move through its return stroke back into its inoperative position under the spring force provided by the track locking assembly 54 and the slight flexure of the lock releasing handle 60.

During this movement of the actuating member 118 back toward and into its inoperative position as the seat back assembly 24 is moved rearwardly, the lock structures 56, 57 move back into their track locking positions which locks the seat cushion assembly 22 in the memory position and returns the lock releasing handle 60 to its equilibrium position. The movement of the actuating member 118 through its return stroke also moves the memory latch 98 from its latched memory position back into its movable adjusting position in latched engagement with the holder member 120 (as illustrated in FIG. 1).

More specifically, as the spring force of the track locking assembly 54 moves the actuating member 118 toward its inoperative position, the outwardly extending arm portion 153 cams over the camming surface 155 of the memory latch 98 causing it to pivot against the spring force of the spring 102 to the movable adjusting position. This moves the teeth out of the apertures 88 and pivots the memory latch 98 upwardly so that the rearward flange 134 is disposed between the upwardly extending portions 106, 108. This places the memory latch 98 in latched relation with the movable track assembly 30 so that when the movable track assembly 30 moves fore or aft during a comfort adjustment of the seat cushion assembly 22, the memory latch 98 is slidingly supported by the block 100 and the flange 136 pushes the memory latch 98 fore and aft to move the memory latch 98 with the movable track assembly 30 and the seat cushion assembly 22.

The forward pivotal movement of the actuating member 118 stops when the actuating member 118 contacts and is stopped against the forward flange 130. This is the inoperative position of the actuating member 118. When the actuating member 118 is in the inoperative position, the outwardly extending arm portion 153 is positioned sufficiently forwardly on the camming surface 155 of the memory latch 98 that the spring force exerted on the memory latch 98 by spring 102 tends to pivot the actuating member 118 into the inoperative position thereof to hold the actuating member 118 against the forward flange 130 on the holder member 120. Therefore, the memory latch 98 spring force holds the actuating member 118 and the memory latch 98 in abutting relation to retain the memory latch 98 in the movable adjusting position and the actuating member 118 in the inoperative position. Thus, it can be understood that when the seat back assembly 24 is moved into the operative position, the seat cushion assembly 22 is relocked in its memory position and memory latch 98 is back in the movable adjusting position so the seat 20 can be occupied by a passenger.

The Seat Can Be Relocked in a Position Forward of the Memory Position

The seat cushion assembly 22 can also be relocked to the fixed track assembly 28 in a position forward of the memory or operative position indicated by the position of the memory latch 98 by returning the seat back assembly 24 from its dumped access position to its operative position before the seat cushion assembly 22 has returned to its operative or memory position.

The one-way lost motion connection 136 is constructed and arranged to move the actuating member 118 out of the lock release retaining position as the seat back assembly 24 is returning to its operative position so that when the seat back assembly 24 is moved fully rearwardly to its operative position, the track locking assembly is conditioned to relock the seat cushion assembly 22 to the fixed track assembly 28.

More specifically, when the actuating member 118 is in the lock release retaining position holding the track locking assembly 54 in the track releasing position against the spring force exerted by the spring arms on the lock structures 56, 57, this spring force also holds the actuating member 118 in this position. Therefore a force must be applied to the actuating member 118 to move it out of the lock release retaining position to free the track locking assembly 54 to return under the spring force provided by the spring arms to its track locking position. The connecting member 136 is constructed and arranged to provide this force on the actuating member 118 to assure track relocking when the seat back assembly 24 is moved into the operative position thereof, but the lost motion feature of the connecting member 136 is constructed and arranged to allow the seat back assembly 24 to move almost fully rearwardly to the operative position thereof before the connecting member 136 moves the actuating member 118 out of the lock release retaining position.

The rearward loop portion 144 of the connecting member 136 provides the lost motion feature of the connecting member 136 because the rivet 147 which connects the downwardly extending arm 138 to the connecting member 136 is sized to move freely in the rearward loop portion 144. As the seat back assembly 24 moves from the dumped access position toward the operative position thereof, the downwardly extending arm 138 pivots forwardly with the motion of the seat back assembly 24. The rivet 147 moves forwardly within the loop 144 to provide a predetermined amount of lost motion between the seat back assembly 24 and the connecting member 136. When the seat back assembly 24 has returned the predetermined distance toward the operative position thereof, continued movement of the seat back assembly 24 biases the rivet 147 against the central coil portion 140 of the connecting member 136 which moves the actuating member 118 out of its lock release retaining position.

Once the actuating member 118 is out of the lock release retaining position, the track locking assembly 54 is free to move into the track locking position to relock the track assembly 48. The spring force that moves the track locking assembly 54 back to the track locking position thereof moves the actuating member 118 through its return stroke toward its inoperative position. When the seat back assembly 24 is in its operative position the actuating member 118 is returned essentially to its inoperative position by the flanged member 66. The actuating member 118 is in overlying relation with and supported by the flanged member 66.

Because the seat back assembly 24 is returned to its operative position with respect to the seat cushion assembly 22 while the seat cushion assembly 22 is forward of the memory position, the memory latch 98 is not in the proximity of the actuating member 118 as the actuating member 118 returns through its return stroke to its inoperative position. Therefore, the memory latch 98 remains engaged with the memory track 76 in its fixed memory position.

If this occurs, the memory latch 98 can be easily unlatched from the memory track 76 and returned to the movable adjusting position by either 1) manually unlocking the track assembly 48 with the lock releasing handle 60 and sliding the seat cushion assembly 22 rearwardly to or past the memory position as in a normal comfort adjustment of the seat cushion assembly 22 or 2) by redumping the seat back assembly 24 to unlock the track assembly 48 and then returning the seat cushion assembly 22 to the memory position with the seat back assembly 24 in the dumped access position in the same manner as is done when normally returning the seat cushion assembly 22 from the forward access position to the memory position after a typical rear seat accessing operation as described above.

When the latter situation occurs, the track assembly 48 relocks and the memory latch 98 is moved from the fixed memory position to the movable adjusting position as described above.

In the former situation, i.e., if the memory latch 98 is engaged in the fixed memory position, the seat back assembly 24 is in its operative position and the movable track assembly 30 is locked to the fixed track assembly 28 in a position forward of the memory position, the seat occupant can simply unlock the track assembly 48 with the lock releasing handle 60 in the manner described above when the operation of the handle 60 during a comfort adjustment was discussed and move the seat cushion assembly 22 rearwardly as in a normal comfort adjustment of the seat cushion assembly 22. The actuating member 118 moves downward slightly in response, but is prevented from entering the lock release retaining position because the seat back assembly 24 is in the operative position thereof.

When the actuating member 118 on the moving seat cushion assembly 22 contacts the forwardly extending arm portion 104 of the stationary memory latch 98, the actuating member 118 moves forwardly as the seat cushion assembly 22 moves rearwardly until the actuating member 118 is in a stopped position against the forward flange 130. Continued movement of the seat cushion assembly 22 cams the actuating member 118 over the forwardly extending arm portion 104 and as the outwardly extending arm portion 153 passes thereover, the memory latch 98 pivots out of the fixed memory position into the movable adjusting position as the seat cushion assembly 22 moves rearwardly into and past the memory position. Thus, the memory latch 98 is moved into the movable adjusting position without interrupting or interfering with the rearward movement of the seat cushion assembly 22. The abutting relation between the memory latch 98 and the actuating member 118 described above retains the memory latch 98 in the movable adjusting position and the actuating member 118 in the inoperative position thereof.

Relative Strengths of the Spring Systems

The seat back spring system and the seat cushion spring system 154 cooperate to provide user convenience when returning the seat cushion assembly 22 to the memory position. The seat back assembly 24 is biased into its dumped access position by the seat back spring system and the seat cushion assembly 22 is biased toward and into its access position by the seat cushion spring system 154. Typically the vehicle user returns the vehicle seat 20 from the access position to the memory position by pushing against a portion of the dumped seat back assembly 24. The pushing force applied to the seat back assembly 24 tends to move seat cushion assembly 22 rearwardly with respect to the fixed track assembly 28 and, depending on the direction of application of the force, may also tend to move the seat back assembly 24 rearwardly with respect to the seat cushion assembly 22 from the dumped access position thereof to the operative position thereof.

Preferably, the spring forces applied by the seat back spring system and the seat cushion spring system 154 are such that the seat cushion assembly 22 is returned to its memory position before the seat back assembly 24 moves rearwardly far enough to move the actuating member 118 out of its lock release retaining position when a typical pushing force is applied to the seat back assembly 24 by the user during the seat return operation, regardless of where the memory position is along the length of the memory track 76.

More specifically, it can be understood that the spring force applied to the seat back assembly 24 by the seat back spring system increases as the seat back assembly 24 moves from the dumped access position toward the operative position thereof The one-way lost motion nature of the connection between the seat back assembly 24 and the actuating member 118 allows the seat back assembly 24 to pivot rearwardly toward its operative position a predetermined distance before the connecting member 136 impacts the actuating member 118 and moves the same forwardly out of the lock release retaining position thereof Preferably when the user returns the seat to the memory position by pushing on the seat back assembly 24 by applying the pushing force thereon, the spring force of the seat back spring system is great enough to allow the seat cushion assembly 22 to move fully rearwardly to its memory position at any point along the range of motion of the seat cushion assembly 22 before the seat back assembly 24 has pivoted rearwardly far enough against the increasing resistance provided by the seat back spring system to move the actuating member 118 forwardly.

It can be appreciated, therefore, that in the preferred embodiment of the vehicle seat 20, the relative strength of the spring forces provided by the seat back spring system and the seat cushion spring system 154 on the seat back assembly 24 and the seat cushion assembly 22, respectively, help assure that the seat cushion assembly 22 moves back to and locks in its memory position.

Figure 9:
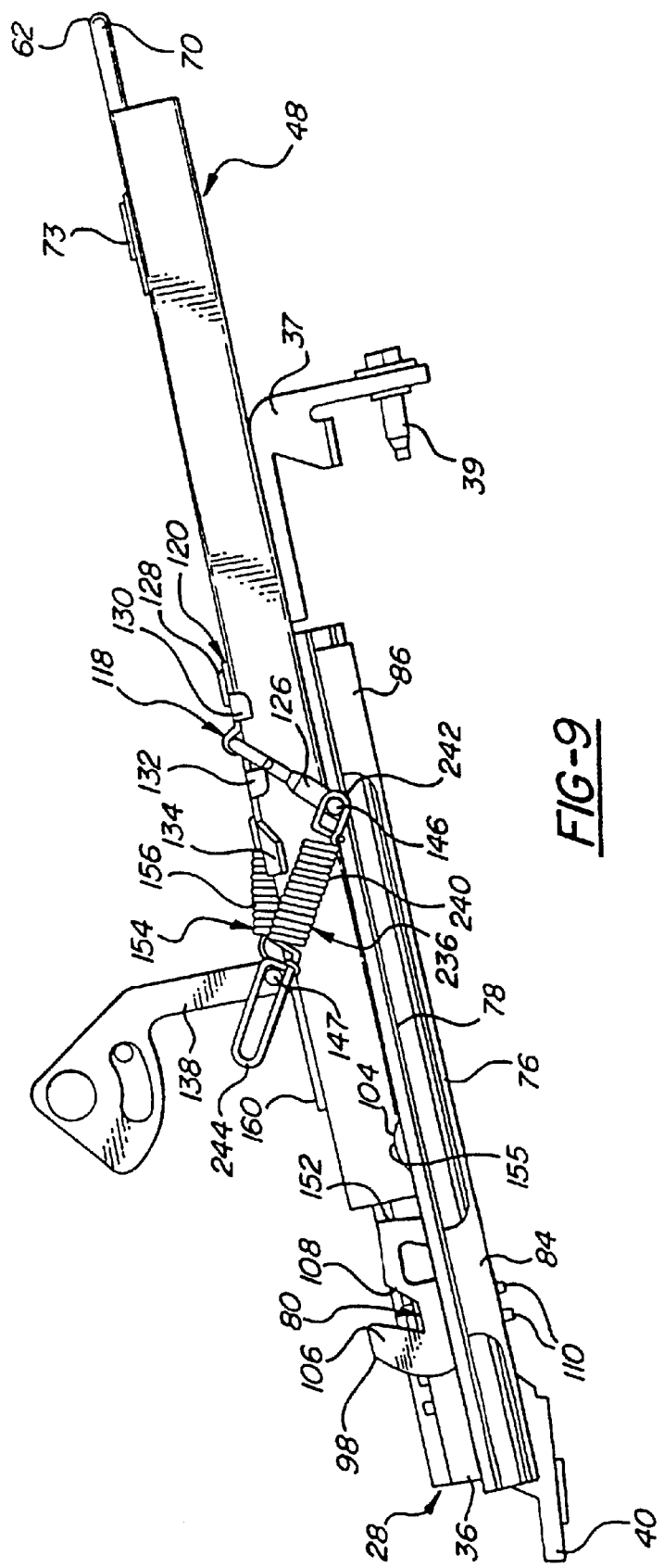
FIG. 9 shows a view of an alternative embodiment of the vehicle seat.

A second embodiment of the vehicle seat 220 is shown in FIG. 9. Many structures of the vehicle seat 220 and the preferred vehicle seat 20 are identical. Identical reference numbers are used to designate identical structures of the two seats 20, 220 and these structures will not be further described when discussing the seat 220. The construction and function of the connecting member 236 is different from the connecting member 136, however.

The central coiled portion 240 of the connecting member 236 is shorter than the coil portion 140 of the connecting member 136 and the rearward loop portion 244 provides enough lost motion between the downwardly extending arm 138 and the actuating member 118 when the seat back assembly 24 is moved from the dumped access position to the operative position to allow the same to be moved fully rearwardly and locked in its operative position while the actuating member 118 is still in the lock release retaining position. Therefore, the seat back assembly 24 of the vehicle seat 220 can be moved back into and locked in its operative position while the seat cushion assembly 22 is forward of the memory position thereof and while the track assembly 48 is still unlocked.

It can be appreciated that when the vehicle seat 220 is dumped and in the forward access position, the connecting member 236 allows the user to return the seat cushion assembly 22 to its memory position (1) with the seat back assembly 24 in the dumped access position or (2) with the seat back assembly 24 locked in the operative position.

In the first case, when the seat cushion assembly 22 is returned to the memory position with the seat back assembly 24 in the dumped access position, the connecting member 236 functions in essentially the same way as the connecting member 136 in the preferred embodiment, i.e., as the seat cushion assembly 22 returns to the memory position, the actuating member 118 impacts the memory latch 98 and the central coiled portion 240 of the connecting member 236 expands or flexes to accommodate the forward movement of the actuating member 118 out of its lock release retaining position, but the connecting member 236 prevents the actuating member 118 from moving through its return stroke under the spring force provided by the track locking assembly 54. When the seat back assembly 24 is thereafter moved from its dumped access position to its operative position, the downwardly extending arm 138 moves forwardly in response to the movement for the seat back assembly 24 allowing the connecting member 236 to move forwardly. This allows the actuating member 118 to return to its inoperative position which allows the track locking assembly 54 to relock and which moves the memory latch 98 to the movable adjusting position.

In the second situation, as the seat cushion assembly 22 is returned to the memory position, the actuating member 118 impacts the memory latch 98 which moves the actuating member 118 out of the lock release retaining position. Because the seat back assembly 24 is in the operative position, the connecting member 236 allows the actuating member 118 to move fully through its return stroke to its inoperative position to relock the track assembly 48 and move the memory latch 98 from the fixed memory position to the movable adjusting position.

It is preferred to provide the vehicle seat 220 with the seat cushion spring system 154 because the seat cushion spring system 154 would provide a safety feature to help assure that the seat is not occupied for use while the track assembly 48 is still unlocked. The seat back spring system provides a safety feature because while the track assembly 48 is unlocked, the seat cushion assembly 22 moves toward its fully forward access position and the vehicle user would be made aware by the spring biased movement of the vehicle seat 220 that the track assembly 48 was unlocked and could then make certain the seat 220 was relocked by moving the seat cushion assembly 22 fully back to the memory position. If the seat cushion spring system 154 is not provided in the vehicle seat 220, the seat users' judgment and discretion would be relied upon for the proper use of the vehicle seat 220.

It can also be appreciated that when the seat back assembly 24 is dumped and the seat cushion assembly 22 is moved forwardly into the access position, the connecting member 236 functions the same way as the connecting member 136.

With Seat Back Lockout Until Full Return

It is contemplated to provide an embodiment of the easy access full memory vehicle seat in which the one-way lost motion connection between the seat back assembly and the actuating member 118 of the seat memory unit 74 does not move the actuating member 118 out of the lock release retaining position when the seat back assembly 24 is returned to its operative position (as, for example, the second embodiment of seat 220 described immediately above and shown in FIG. 9), but which incorporates a mechanism that prevents the seat back assembly from pivoting fully rearwardly and locking in its operative position until the track assembly 48 has relocked. Such a lockout mechanism is fully described and disclosed in WO 98/25785 and entitled "Easy Entry Seat Back Lockout Until Full Return".

The lockout mechanism disclosed therein can prevent the seat back assembly from pivoting fully rearwardly and locking during a rear seat accessing operation by providing a control mechanism which prevents the full rearward pivoting of the seat back assembly while the lock releasing handle 60 is held in the actuated position by the seat memory unit 74 in the present case. This prevents the seat back assembly 24 from moving into its operative position until the track assembly 48 is relocked. The mechanism disclosed in WO 98/25785 is fully compatible with the seat memory unit 74 and the lock releasing handle 60 of the present invention and can optionally be incorporated into a vehicle seat in which the unit 78 and the lock releasing handle 60 are included.

Because the lock-out feature prevents the seat back assembly 24 from moving into its operative position while the lock releasing handle 60 is in the actuated position, the seat back assembly 24 is locked out of its operative position while the seat cushion assembly 22 is forward of its memory position because the actuating member 118 is in its lock release retaining position which holds the handle 60 in its actuated position.

When the seat cushion assembly 22 is returned to the memory position, the actuating member 118 impacts the memory latch 98 which moves the actuating member 118 out of the lock release retaining position. The lock-out feature allows the seat back assembly 24 to move toward the operative position thereof a predetermined distance while the handle 60 is in the actuated position and this distance is enough to allow actuating member 118 to move forwardly enough for the track locking assembly 54 to relock. This relocking returns the lock releasing handle 60 toward its equilibrium position enough to effect the lock-out mechanism as described in the above cited patent application to allow the seat back assembly 24 to be moved to its operative position and relocked.

It can be understood that when the lock-out mechanism is included in the vehicle seat 220, the seat cushion spring system 154 is not needed as a safety feature but can be optionally included and used when the lock-out mechanism is included as a convenience feature.

It can be appreciated by one skilled in the art that the embodiments of the vehicle seat including the seat memory unit 74 and the lock releasing handle 60 are exemplary only and that variations of the vehicle seat including the seat memory unit 74 and the lock releasing handle 60 are within the scope of the invention. It can also be appreciated that the seat memory unit 74 and the handle 60 can be used to lock, unlock and provide a seat memory function with a wide variety of track structures. The seat memory unit 74 can also be used with a powered seat adjustment mechanism that can move the seat cushion assembly 22 fore and aft, up and down or change the angle between the vehicle floor 21 and the top surface of the seat electrically, electromechanically, pneumatically or by any other known means.

The seat memory unit 74 can also be used with any conventional reclining assembly that allows the vehicle user to recline the seat back assembly 24 either manually or automatically through a range of comfort adjustments. The seat memory unit 74 and lock releasing handle 60 can be used, for example, with any conventional sector gear recliner mechanism or with any linear recliner. The seat memory unit 74 and lock releasing handle 60 can also be used in a vehicle seat that has no reclining function and is simply pivotable between an operative position and a dumped access position.

It is also contemplated and within the scope of the invention to provide a separate spring system to move the actuating member 118 through the return stroke thereof and additionally or alternatively to provide a spring system mounted to the lock releasing handle 60 to return the same from the access position thereof to the equilibrium position thereof.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the invention may be practiced otherwise than as specifically described.

What is claimed is:

1. An easy access vehicle seat (20) comprising:
a seat cushion assembly (22) for supporting an occupant when seated thereon,
a seat back assembly (24) for supporting a back of an occupant seated on said seat cushion assembly (22),
a mounting assembly (26) mounting said seat back assembly (24) on said seat cushion assembly (22) for moving said seat back assembly (24) between an operative position and a forwardly dumped access position generally overlying said seat cushion assembly (22),
a fixed track assembly (28) for attachment to a vehicle,
a movable track assembly (30) carrying said seat cushion assembly (22) and movably supported by said fixed track assembly (28) for incremental adjustment between fore and aft positions when said seat back assembly (24) is in said operative position as well as movement to a forward access position when said seat back assembly (24) is in said forwardly dumped access position;
a releasable track locking assembly (54) movable between a track locking position for locking said movable track assembly (30) with respect to said fixed track assembly (28) and a track releasing position for allowing said adjustment of said movable track assembly (30) between said fore and aft positions with respect to said fixed track assembly (28),
a memory track (76) fixed with respect to said fixed track assembly (28),
a memory slide (78) fixed with respect to said memory track (76),
a slide block (100) slidably supported by said memory slide (78), and
said vehicle seat (20) characterized by a memory latch (98) supported by said slide block (100) and movable between a memory position when said seat back assembly (24) is in said forwardly dumped access position and an adjustment position when said seat back assembly (24) is in said operative position, said memory latch (98) uncoupled from said movable track assembly (30), and interlocking with said memory track (76) while in said memory position thereby limiting independent return travel of said movable track assembly (30) from said forward access position, and coupled to said movable track assembly (30) and disengaged from said memory track (76) while in said adjustment position enabling said adjustment of said movable track assembly (30), said memory latch (98) remaining in said adjustment position disengaged from said memory track (76) during said adjustment of said movable track assembly (30) between said fore and aft positions while said track locking assembly (54) moves between said track locking position and said track releasing position.

2. An easy access vehicle seat as set forth in claim 1 including an actuating assembly being interrelated with said releasable track locking assembly (54), said memory latch (98) and said seat back assembly (24) for moving said memory latch (98) between said adjustment position and said memory position and moving said releasable track locking assembly (54) between said track locking position and said track releasing position in response to movement of said seat back assembly (24) between said operative position and said access position.

3. An easy access vehicle seat as set forth in claim 2 including a lost motion connection between said actuating assembly and said seat back assembly (24) for effecting said releasable track locking assembly (54) to move to said track releasing position in response to forward movement of said seat back assembly (24) without effecting said releasable track locking assembly (54) to move to said track locking position in response to return movement of said seat back assembly (24) enabling said actuating assembly to engage said memory latch (98) and responsively urge said releasable track locking assembly (54) to move to the track locking position.

4. An easy access vehicle seat as set forth in claim 3 wherein said memory latch (98) has a cam surface (155) for engaging said actuating assembly to retain the memory latch (98) in the adjustment position while said releasable track locking assembly (54) is in said track releasing position.

5. An easy access vehicle seat as set forth in claim 4 wherein said memory track (76) includes a plurality of apertures (88) and said memory latch (98) includes teeth (10) for engaging said apertures (88) in said memory position.

6. An easy access vehicle seat as set forth in claim 5 wherein said releasable track locking assembly (54) operatively interconnects said fixed (28) and movable (30) track assemblies to present a locking system independent of said memory latch teeth (110) and memory track apertures (88).

7. An easy access vehicle seat as set forth in claim 1, including
a seat back spring system resiliently biasing said seat back assembly (24) to move to said seat back assembly (24) to said access position, and
a seat cushion spring system (154) resiliently biasing said seat cushion assembly (22) to move along said fixed track assembly (28) to said forward access position, said springs systems each having relative strengths such that said seat back spring system provides greater resistance to a return of the seat back assembly (24) into the operative position thereof than the seat cushion spring system (154) provides a return of the seat cushion assembly (22) into an aft position thereof.

8. An easy access vehicle seat as set forth in claim 7 including an actuating assembly being interrelated with said releasable track locking assembly (54), said memory latch (98) and said seat back assembly (24) for moving said memory latch (98) between said adjustment position and said memory position and moving said releasable track locking assembly (54) between said track locking position and said track releasing position in response to movement of said seat back assembly (24) between said operative position and said access position.

9. An easy access vehicle seat as set forth in claim 8 including a lost motion connection between said actuating assembly and said seat back assembly (24) for effecting said releasable track locking assembly (54) to move to said track releasing position in response to forward movement of said seat back assembly (24) without effecting said releasable track locking assembly (54) to move to said track locking position in response to return movement of said seat back assembly (24) enabling said actuating assembly to engage said memory latch (98) and responsively urge said releasable track locking assembly (54) to move to the track locking position.

10. An easy access vehicle seat as set forth in claim 9 wherein said memory latch (98) has a cam surface (155) for engaging said actuating assembly to retain the memory latch (98) in the adjustment position while said releasable track locking assembly (54) is in said track releasing position.

11. An easy access vehicle seat as set forth in claim 10 wherein said memory track (76) includes a plurality of apertures (88) and said memory latch (98) includes teeth (110) for engaging said apertures (88) in said memory position.

12. An easy access vehicle seat as set forth in claim 11 wherein said releasable track locking assembly (54) operatively interconnects said fixed (28) and movable (30) track assemblies to present a locking system independent of said memory latch teeth (110) and memory track apertures (88).

* * * * *

UNITED STATES PATENT AND TRADEMARK OFFICE
CERTIFICATE OF CORRECTION

PATENT NO. : 6,513,868 B1
DATED : February 4, 2003
INVENTOR(S) : Tame

It is certified that error appears in the above-identified patent and that said Letters Patent is hereby corrected as shown below:

Column 3,
Line 2, delete "partially" and insert -- partially -- therefor;
Line 20, delete "the" and insert -- a -- therefor to read -- mounted to a floor --;
Line 38, insert -- 20 -- after "seat" and before "and";
Line 61, delete "supported" and insert -- support -- therefor;

Column 4,
Line 21, delete "PivoTable" and insert -- pivotably -- therefor;

Column 6,
Line 30, delete "recliner" and insert -- reclining -- therefor;
Line 50, delete "illustrated";

Column 8,
Line 9, delete "stoke" and insert -- stroke -- therefor;
Line 25, delete "unlocked" and insert -- unlock -- therefor;

Column 9,
Line 37, delete "tack" and insert -- track -- therefor;
Line 63, delete "memorylatch" and insert -- memory latch -- therefor;

Column 13,
Line 63, insert -- . -- after "thereof" and before "The" to read -- thereof. The --;

Column 14,
Line 2, insert -- . -- after "thereof" and before "Preferably" to read -- thereof. Preferably --;
Line 18, delete "help" and insert -- helps -- therefor;

Column 17,
Line 54, insert -- releaseable -- between "said" and "track" to read -- said releaseable track --;

UNITED STATES PATENT AND TRADEMARK OFFICE
CERTIFICATE OF CORRECTION

PATENT NO. : 6,513,868 B1
DATED : February 4, 2003
INVENTOR(S) : Tame

It is certified that error appears in the above-identified patent and that said Letters Patent is hereby corrected as shown below:

<u>Column 18,</u>
Line 9, delete "the" and insert -- said -- therefor;
Lines 12 and 35, delete "the" and insert -- said -- therefor;
Lines 36 and 37, delete "the" and insert -- said -- therefor;
Lines 59 and 63, delete "the" and insert -- said -- therefor.

Signed and Sealed this

Fifteenth Day of April, 2003

JAMES E. ROGAN
*Director of the United States Patent and Trademark Office*